United States Patent Office 3,166,376
Patented Jan. 19, 1965

3,166,376
PROCESS FOR MAKING HYDRAZINE DIBORANE
John A. Brown, Berkeley Heights, N.J., assignor to Esso Research and Engineering Company, a corporation of Delaware
No Drawing. Filed Feb. 23, 1960, Ser. No. 10,837
6 Claims. (Cl. 23—14)

This invention relates to an improved process for preparing a hydrazine compound. Specifically, it concerns the use of certain oxygen-containing substances in the manufacture of hydrazine diborane which is useful as a fuel or monopropellant in a pure rocket.

A great deal of research work has been undertaken in recent years to find suitable monopropellants that are capable of propelling rocket devices. Solid monopropellants that are stable at ambient temperatures are highly desirable in motors in "pure" rockets, i.e. thrust producers which do not use the surrounding atmosphere, because they can be stored for long periods of time and are ready for immediate use. The term "monopropellant" as used herein means a substance which does not need any other substance to bring about the release of its thermochemical energy.

It is known that hydrazine diborane, which is an outstanding monopropellant and fuel for pure rockets, can be prepared by reacting ionic hydrazine compounds, such as hydrazine sulfate with ionic borohydrides, as described and claimed in U.S. patent application S.N. 855,468, filed November 25, 1959, which is a continuation-in-part of U.S. patent application S.N. 820,823, filed June 15, 1959, by Frank C. Gunderloy, Jr. However, one difficulty which was encountered in the production of hydrazine diborane, from for instance hydrazine sulfate and sodium borohydride, was a slow rate of reaction. Small yields of product were recovered even after the reaction had been carried out for several days.

It has now been discovered that the addition of certain oxygen-containing substances, especially water, substantially increase the reaction rate and therefore reduce the reaction time in many instances to 30 minutes or an hour. This surprising effect of these oxygen-containing substances on the reaction rate makes the commercial production of hydrazine diborane feasible. Moreover, as will be described in detail later, the purity of the final product is enhanced by the use of these oxygen-containing substances since other impurities in the reaction mixture are removed when the oxygen-containing substances are separated from the reaction mixture.

In accordance with the present invention, 1 mole of an inorganic or organic ionic hydrazine compound is contacted with about 2 to 2.5 moles of an ionic inorganic borohydride between about −80° C. and the melting point of the reaction product in the presence of a polar oxygen-containing promoter. Stoichiometric amounts of the reactants are generally suitable.

The atmosphere of the reaction zone may consist of an inert gas such as nitrogen or helium, although this is not necessary. For instance, air is a satisfactory atmosphere. The initial atmosphere is not important, particularly where a closed reactor is employed, because hydrogen is evolved during the reaction and this gas tends to displace the atmosphere present when the reaction commences.

The order in which the materials, other than the promoter, are introduced into the reaction zone is not critical, and if desired, they may all be added at the same time. The promoter is preferably added last dropwise or in small portions. It is highly desirable to have a diluent present in the reaction zone to facilitate the mixing of the reactants, with for example, a stirrer, and also in certain cases to assist in the separation of the product from the reaction mixture. The most suitable diluents are cyclic ethers, such as tetrahydrofuran. It is advisable not to employ diethyl ether since this substance may cause the reaction product to decompose at ambient temperatures and thus result in the loss of product.

The hydrazine reactant is a compound which contains a diprotic hydrazinium ion ($N_2H_6^{++}$) whose primary valence is ionically bonded to a negative ion or anion. Hydrazine reactants coming within the purview of this invention have the formula:

$$S_x(N_2H_6^{++})_m$$

wherein "S" is one or more organic or inorganic anions; "H" and "N" are hydrogen and nitrogen, respectively; "$x$" is an integer of 1 to 2 and is the number of anions needed to balance the formula, i.e. it is 1 when "S" is a divalent anion and 2 when "S" is monovalent; and "$m$" is an integer of 1 to 3 which is equal to one-half of the valence of anion "S." If the anion is monovalent, e.g. bromide, then "$x$" is 2 and "$m$" is 1; if it is divalent, e.g. sulfate, then "$x$" is 1 and "$m$" is 1. The anion "S" is generally a non-metallic ion, such as acetate, formate, carbamate, phosphite, phosphate, azide, nitrite, nitrate, sulfate, chlorate, perchlorate, butyrate, laurate, oxalate, glutarate, cyanate, thiocyanate and halide, e.g. chloride and bromide. The organic anions may be mono- or polycarboxylic acid radicals having 1 to 16 carbon atoms. The lower molecular weight, e.g. $C_1$ to $C_4$, saturated acids are preferred. Examples of specific hydrazine compounds coming within the scope of the above formula are: hydrazine dihydrochloride, hydrazine diacetate, hydrazine diformate, hydrazine diphosphate, hydrazine dinitrate, hydrazine dichlorate, hydrazine diperchlorate, hydrazine dicyanate, hydrazine dihydrobromide and hydrazine sulfate.

The borohydride reactant may be any stable salt, such as a metal borohydride or a nitrogen-containing borohydride. The preferred inorganic metal borohydrides are the alkali metal borohydrides, such as sodium, lithium or potassium borohydride. Other metal borohydrides, such as aluminum or the alkaline earth metals, e.g. calcium and magnesium can be used. Quaternary ammonium salts, such as the tetraalkyl ammonium borohydrides, e.g. tetraethyl or tetramethyl ammonium borohydride, are also satisfactory. The preferred reactants are sodium borohydride and hydrazine sulfate or hydrazine dibromide because of the high yields they produce within a short time.

The oxygen-containing substances which promote the reaction of the ionic hydrazine compound with the ionic boron hydride are polar compounds which are capable of freeing the electron pair on one or both of the nitrogens in the hydrazine compounds. Moreover, it is believed that if the borohydride ion is in a relatively acidic environment the removal of a hydride ion will be facilitated. Thus polar substances, such as water and alcohols, produce these conditions and thereby increase the reaction rate. One theory is that the nitrogen of the hydrazine molecule forms a bond with the boron atom and the hydride ion is displaced so that it can combine with a proton available in the acidic material or the solvent to form molecular hydrogen. The first step in the process leads to the formation of hydrazine monoborane and the second reaction of the hydrazine portion of the molecule forms hydrazine diborane. It was observed that the borohydride did not decompose to diborane in the absence of the hydrazine moiety, even in the presence of the acidic catalyst. Therefore, it is apparent that the decomposition of the boron hydride ion is not the initiating step of the reaction.

The preferred promoter for the reaction is of course water because of its low cost, high activity and the fact that it presents no separation problems. Alcohols, especially the lower molecular weight primary monohydric alcohols such as methanol and ethanol, may be used in place of or with water. However, because they present difficulties insofar as separation is concerned and are not as active as water, they are not preferred. The low molecular weight polar oxygen-containing substances used in the present invention may be generically defined by the following formula:

R·OH in which "R" is hydrogen or a $C_1$ to $C_2$ alkyl and "OH" is a hydroxyl group.

While the addition of even small amounts of the oxygen-containing promoters to the reaction zone improves the reaction rate, it has been found that significant improvements are obtained when about 1 to 5 moles of the promoters are employed per mole of hydrazine reactant. In the case of water, optimum yields are obtained with about 1.5 to 3 moles of water per mole of hydrazine reactant. Larger amounts of water cause slight increases in yield but in turn make the separation more difficult.

Since the reactants are generally solids, as mentioned above, it is desirable to employ an inert liquid diluent to facilitate handling the reactants and afford better contact in the reaction zone. It is sometimes advantageous to admix one or both reactants with diluent before introducing them to the reaction zone where they are brought into intimate contact by means of an efficient stirring device. The diluent should not contain any functional groups which react either with the reactants or the desired product, except of course where it promotes the reaction in some manner. Among the common inert organic and inorganic diluents that may be used are $C_5$ to $C_{10}$ hydrocarbons such as benzene, heptane, nonane and hexane, esters, such as ethyl acetate, amides such as dimethyl formamide, and acetals such as methylal. Carbonyl compounds, i.e. aldehydes and ketones, and alcohols are usually not satisfactory diluents. The preferred diluents are 5 or 6 member heterocyclic ethers, such as tetrahydrofuran, dihydropyran and dioxan, because they are solvents for the hydrazine diborane product. These solvents facilitate the separation of the product from the reaction mixture because the nongaseous by-products are often insoluble in these ethers. Thus, by using organic cyclic ethers, separation can be accomplished by filtration and precipitation of the product with, for example, a hydrocarbon liquid. Moreover, in a continuous process, the cyclic ether can be continuously removed from the reaction zone, flashed or distilled from the product and recycled to the reactor. The amount of diluent used in the reaction mixture is not critical. Of course, a substantial quantity, e.g. 50 to 99.5 wt. percent, should be present in the reaction zone to permit easy handling of the reactants. Where the diluent is not a selective solvent for the product, separation may be achieved by distilling. Other separation techniques known in the art may also be employed, such as selective extraction and evaporation of the solvent.

The liquid promoter is advantageously added in increments or intermittent portions either alone or in admixture with a portion of the diluent. The manner in which the promoter is added is not important as long as adequate control is maintained over the reaction.

The reaction conditions are not critical, and therefore, the temperatures and pressures employed are governed by the economics of the particular process. Ambient temperature and atmospheric pressure are suitable conditions for carrying out the reaction. However, temperatures in the range of 0 to 30 or 45° C. and pressures between about 10 mm. and 1 atmosphere or slightly higher have been found to be quite satisfactory. Care must be taken at the higher temperatures, e.g. above 50° C., to avoid degradation of the desired reaction product. Thus while higher temperatures reduce reaction time, they are usually accompanied by other things which may be more injurious than the benefits derived by their use.

The addition of the oxygen-containing promoter to the reaction zone increases the reaction rate to such an extent that under optimum conditions a 20 to 30% yield of product may be obtained within 1 or 2 hours. The reaction can be regulated by adjusting the addition of promoter. Depending upon the level of conversion, and other factors including heat transfer, the reaction time may vary from as little as a few minutes up to several hours or more, e.g. 5 hours. Upon addition of the materials to the reaction zone including a portion of the promoter, it will be noted that the reaction commences almost immediately as evidenced by the evolution of hydrogen from the reaction mixture and increased temperature. The hydrogen evolved may be recovered by conventional techniques and used in chemical processes such as the hydrogenation of aldehydes to alcohols.

The hydrazine diborane product prepared in accordance with the present invention may be recovered by any one of several different methods. For instance, where a cyclic ether such as tetrahydrofuran is employed as the diluent, the solids in the reaction mixture may be removed by filtration and the hydrazine diborane in the filtrate can be recovered by evaporating the tetrahydrofuran and oxygen-containing substance either by warming the liquid or passing a stream of gas, such as nitrogen, over it until substantially all of the diluent and oxygen-containing substance have been removed. This procedure results in the recovery of hydrazine borane which may contain from 5 to 15 wt. percent impurities. A preferred procedure is to add an inert nonsolvent, such as a lower molecular weight hydrocarbon, to the filtrate and separating the precipitate formed by a second filtration. Very high purity product can be obtained by adding a part of the nonsolvent to the filtrate until a substantial precipitation is noted, filtering off the precipitate formed, which comprises mainly water and impurities, and thereafter adding a larger portion of nonsolvent to the second filtrate to precipitate the hydrazine diborane product. The solid product obtained from the second filtrate, when dried to constant weight, is generally between 99 and 100% pure. It was noted that when about 2 moles of water per mole of hydrazine reactant was employed, that about 1 to 3 volumes of hydrocarbon, e.g. pentane or heptane, per volume of filtrate was sufficient to precipitate substantially all of the water and impurities in the reaction mixture. Much larger volumes of the nonsolvent liquid, e.g. 5 to 15 volumes per volume of second filtrate, may be used to precipitate the product.

The nonsolvents used in the above-described fractional precipitation method may be a liquid hydrocarbon, such as pentane, hexane, benzene, toluene, cyclohexane or other inert nonsolvent miscible with the diluent. The nonsolvent should be a liquid under the precipitating conditions and may contain from 5 to 8 carbon atoms. The preferred hydrocarbon nonsolvents are low boiling liquid aliphatic compounds.

The hydrazine diborane prepared in accordance with the process described herein is highly stable at room temperature (25° C.) and is only slightly sensitive to impact or friction. It has the empirical formula $B_2N_2H_{10}$ and is believed to have the following structure:

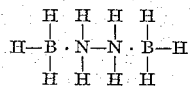

in which there are coordinate bonds between the nitrogen and boron atoms. The product has no detectable melting point up to 260° C. It has a calculated specific impulse of 286 sec.$^{-1}$, and when admixed with fuels, such as boron or aluminum, and oxidizer, such as ammonium perchlorate, higher specific impulses are obtained.

The hydrazine diborane prepared in accordance with the present invention can be compounded with conventional materials used in solid rocket propellant systems, such as binders or adhesive substances. Because this monopropellant possesses an unusually low flame temperature, 1500 to 2000° K., it is especially suited for use in end burning rockets. End burning grains allow a more efficient use of the rocket case's volume and impose fewer mechanical (structural) limitations on the propellant. It is also useful as a coolant in rocket propellant mixtures which normally burn at high temperatures. If desired, an oxidizing agent, such as fluorine, can be included in the propellant mixture to change the combustion characteristics of the borane. The diborane may also be used in many chemical reactions as a reducing agent, e.g. in the preparation of oximes.

The following examples specifically describe how hydrazine diborane can be prepared by this improved method.

Example 1

The reactor is a 5 liter glass flask having a thermometer well and equipped with an efficient stirrer. The reactor has a gas outlet and is connected to a burette through which water may be added. To the reactor, which is partially submerged in an ice bath, is added 436 g. of hydrazine sulfate, 254 g. of sodium borohydride, and 1500 ml. of tetrahydrofuran (THF). It is noted that there is an initial evolution of hydrogen due to traces of water in the reactants, but this soon subsides. The reactor is closed and a wet test meter is attached to the gas outlet prior to adding water to the reactor from the burette. Stirring is commenced and the stirrer is maintained at a speed such that excessive splashing is avoided. Thereafter the water is added intermittently in 5 ml. portions so that the reaction temperature is kept between 15 and 20° C. and an even rate of gas evolution. The total amount of water (90 ml.) is added to the reactor over a period of 1 hour. Upon completing the addition of the water, the reaction mixture is stirred for another hour. Thereafter the reaction mixture is filtered through filter paper in a Buchner funnel and the residue in the reaction mixture is discarded. Heptane (3 liters) is added to the filtrate until a white precipitate begins to form. The filtrate is then stirred until the precipitate coagulates and leaves a clear mother liquor. The filtrate is then filtered and the residue is again discarded. The second filtrate is then diluted with 10 volumes of heptane and stirred until the precipitate coagulates and a clear mother liquor is obtained. The second filtrate is filtered and the precipitate, which is in the form of a cake, is dried in a vacuum desiccator to constant weight. At 30 to 60 mm. of mercury absolute pressure, the drying process takes about 2 to 5 days. The yield of substantially 100% pure hydrazine diborane is 55 grams. The product is identified by its infrared absorption spectrum.

Example 2

The following is another method of preparing hydrazine diborane in accordance with the invention:

17.6 gms. of hydrazine dihydrochloride and 12.66 gms. of sodium borohydride are stirred in 75 ml. of THF in a closed reaction flask connected to a gas meter. To the reactants is added 2.4 ml. of water as a 25 wt. percent solution in THF, over a period of 2 hours, with stirring and cooling of the reaction mixture. The temperature is held to about 25 to 30° C. During the reaction 0.304 cu. ft. (unconverted) of hydrogen is given off. The slurry is then filtered and the filtrate diluted with 1 liter of petroleum ether, whereupon the hydrazine diborane product precipitates. The product, which is dried in a vacuum desiccator, weighs 1.7 grams, a 17% yield.

Example 3

The following example describes the use of an alcohol as the promoter:

10.9 gms. of hydrazine sulfate and 6.3 gms. of sodium borohydride are stirred in 75 ml. of THF in a closed reaction flask connected to a gas meter. To this is added 7 ml. of methyl alcohol over a period of 1 hour (but it can be added all at once). A moderate reaction takes place, giving off 0.132 cu. ft. (unconverted) of hydrogen over a period of 2 hours and needing almost no cooling. The mix is filtered and the filtrate diluted with 500 ml. of n-hexane, whereupon 3.17 gms. of product precipitates, for a yield of 63%. The product is gummy and not as pure as the hydrazine diborane obtained in the above examples. This example shows that alcohols are not as useful as water in the present process due to the separation and purification difficulties encountered with the former.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. In a process for preparing hydrazine diborane by reacting a borohydride salt from the group consisting of alkali metal, alkaline earth metal, aluminum, and quaternary ammonia borohydride salts with a hydrazine salt containing a diprotic hydrazinium ($N_2H_6^{++}$) in an inert liquid organic diluent with evolution of hydrogen to form hydrazine diborane having the empirical formula $B_2N_2H_{10}$ and a solid by-product salt from the cation of the borohydride salt and from the anion of the hydrazine salt in the resulting reaction mixture, followed by separation of unreacted salt and said by-product salt from a solution of the hydrazine diborane in the diluent, and recovery of the hydrazine diborane from the diluent, the improvement which comprises effecting the reaction of the borohydride salt with the hydrazine salt in the presence of a polar oxygen-containing promoter selected from the group consisting of water, methanol and ethanol in a proportion of about 1 to 5 moles per mole of the hydrazine salt in the reaction mixture to increase the rate of reaction.

2. In the process as defined in claim 1, the promoter being admixed with the reaction mixture in small amounts at a time to promote the reaction.

3. In the process as defined in claim 1, recovery of the hydrazine diborane from solution in the inert liquid organic diluent being carried out by fractional precipitation and separation from the solution of the hydrazine diborane by an inert organic liquid nonsolvent of substances less soluble than the hydrazine diborane, then fractional precipitation of the hydrazine diborane.

4. In the process as defined in claim 3, the inert liquid organic diluent used for dissolving the hydrazine diborane in the reaction mixture being a cyclic ether and the nonsolvent for the fractional precipitation and separation being a low boiling hydrocarbon.

5. In a process for preparing hydrazine diborane by reacting hydrazine sulfate with sodium borohydride in a cyclic ether as inert diluent to form the hydrazine borane in the resulting mixture to form the hydrazine diborane having the empirical formula $B_2N_2H_{10}$ in the resulting mixture and sodium sulfate as a by-product with evolution of hydrogen, followed by removal of by-product and unreacted material from a resulting solution of the hydrazine diborane in the diluent and by separation of the hydrazine diborane from said diluent, the improvement of admixing relatively small portions of water with the reaction mixture to increase the rate of reaction resulting in the formation of the hydrazine diborane.

6. In a process for preparing hydrazine diborane having the empirical formula $B_2N_2H_{10}$ by reacting sodium borohydride with a hydrazine salt containing a diprotic hydrazinium ion ($N_2H_6^{++}$) in an inert liquid cyclic ether diluent with evolution of hydrogen to form the hydrazine diborane and a solid by-product from the sodium of the borohydride salt and from the anion of the hydrazine salt in the resulting reaction mixture, followed by separation of unreacted salt and said by-product salt from a solution of the hydrazine diborane in the diluent, and recovery of the hydrazine diborane from the diluent, the improvement which comprises effecting the reaction of sodium borohydride with hydrazine salt in said reaction mixture in the presence of a small amount of water and admixing small portions of water with the reaction mixture to increase the rate of the reaction of the sodium borohydride with the hydrazine salt while reaction takes place over a period in the range of a few minutes to about 2 hours, the rate of addition of the water as a promoter being adjusted to the removal of hydrogen gas from the reaction mixture.

References Cited in the file of this patent

UNITED STATES PATENTS

| | | |
|---|---|---|
| 2,545,633 | Schlesinger | Mar. 20, 1951 |
| 2,774,725 | Swenson et al. | Dec. 18, 1956 |

OTHER REFERENCES

Schechter et al.: "Boron Hydrides and Related Compounds," 2nd edition, pp. 6, 13, 49, 50, 69, and 78, May 1954, declassified Jan. 6, 1958.

Steindler et al.: J. Am. Chem. Society, vol. 75, p. 756 (1953).